United States Patent
Greenaway

[15] 3,658,404
[45] Apr. 25, 1972

[54] COMPLEX WAVE MODIFYING STRUCTURE HOLOGRAPHIC SYSTEM

[72] Inventor: David L. Greenaway, Bassersdorf, Switzerland

[73] Assignee: RCA Corporation

[22] Filed: Mar. 27, 1969

[21] Appl. No.: 810,983

[30] Foreign Application Priority Data

June 20, 1968 Great Britain..............29,579/68

[52] U.S. Cl..............................350/3.5, 350/162 SF
[51] Int. Cl..........................................G02b 27/22
[58] Field of Search................................350/3.5, 162

[56] References Cited

UNITED STATES PATENTS 3,582,177  6/1971  Kiemle.........................350/3.5
3,506,327  4/1970  Leith et al.....................350/3.5

OTHER PUBLICATIONS

Gabor, Nature, Vol. 208, pp. 422–423 (10/1965).
Ramberg, RCA Review, Vol. 27, pp. 472–479 (12/1966).
Lu, Proceedings of the IEEE, Vol. 56, pp. 116–117, (1/1968).

Primary Examiner—David Schonberg
Assistant Examiner—Robert L. Sherman
Attorney—Edward J. Norton

[57] ABSTRACT

The use of a particular complex wave modifying structure for making a special type of hologram. This structure, which works on the principles of optics, in the preferred embodiments can be a pinhole plate or lens array which when illuminated by a first portion of coherent wave energy produces a plurality of similar but separate spaced divergent reference beams. The special type of hologram results from interference at the surface of or in a recording medium between an information beam obtained from an object illuminated by a first component of coherent wave energy with second component consisting of each of the separate spaced reference beams. This special type of hologram, when read out by a proper single readout beam of wave energy, produces a separate image of the object corresponding to each and every one of the spaced reference beams.

3 Claims, 3 Drawing Figures

INVENTOR
DAVID L. GREENAWAY

BY George J. Seligsohn
ATTORNEY 3,658,404

COMPLEX WAVE MODIFYING STRUCTURE HOLOGRAPHIC SYSTEM

This invention relates to holography, and, more particularly, to the use in making a hologram of a complex wave modifying structure working on the principles of optics, which produces a predetermined specific effect on wave energy impinging thereon. Although not limited thereto, the invention is particularly suitable to such a structure which is responsive to illumination thereof by coherent wave energy for producing a plural number of separate spaced point sources lying in a given plane. This makes it possible to produce a special type of hologram in which information about a single object may be stored in a manner such that upon readout separate spaced images of the object are simultaneously produced, wherein each of said images corresponds to a different one of the plural number of separate spaced point sources.

The usual method for obtaining a matrix of identical patterns from a single pattern is to utilize a step-and-repeat process. For instance, a step-and-repeat camera is utilized in the artwork reproduction in integrated circuit technology, to produce a reduced-size matrix of patterns on a photosensitive surface of a complex pattern which represents one of the masks for a basic unit of the integrated circuit. This is accomplished by a process of successive exposures on different areas of the photosensitive surface of the complex pattern, which has been reduced photographically to an appropriate size. The present invention is capable of simultaneously producing a matrix of identical patterns from a single pattern by a holographic method, without recourse to the present sequential exposure technique using the step-and-repeat camera.

It is therefore an object of the present invention to provide a special type of hologram in which one of the two interfering wave components forming the hologram has been operated on by a particular complex wave modifying structure working substantially on the principles of optics for producing a predetermined specific effect on wave energy impinging thereon.

It is a more specific object of certain embodiments of the present invention to provide such a special type of hologram which is capable upon readout of producing an image comprising a plural number of replicas of a single object, which replicas are arranged in a given configuration.

Holograms may be recorded as a three-dimensional volume interference pattern or, at least nominally, a two-dimensional surface interference pattern, in which the recorded intensity variations which form the hologram may be either density variations (blackening of a photographic film, for instance) or phase variations (changes in refractive index or optical thickness of a transparent hologram record, for instance). So-called "surface" holograms in real photographic emulsions are in fact complicated combinations of both surface and volume effects, and both density and phase variations.

This invention is intended to cover all types of holograms, both surface and volume and both density and phase.

The principles of optics are concerned with the laws of reflection, refraction and diffraction. Although optics usually relates only to light, the principles of optics apply to other types of wave energy. For instance, there are microwave reflectors and microwave lenses, as well as acoustic reflectors and acoustic lenses. Therefore, the terms "wave" and "wave energy," as used herein, are not confined to light energy, but include all types of wave energy for which the principles of optics apply.

As alluded to above, the present invention is directed to apparatus for producing and reading out a hologram, and the hologram itself, resulting from the recording of the interference between two components of coherent wave energy in which one of the components has been operated on by a particular complex wave modifying structure working on the principles of optics for producing a predetermined specific effect on wave energy impinging thereon. By a complex wave modifying structure is meant a coordinated arrangement of elements working on the principles of optics, such as gratings, lenses, mirrors, and/or prisms, rather than a single lens or mirror, which results in the component which has been operated on having a wavefront which is tailored to a predetermined desired configuration. More specifically, this predetermined desired configuration may be a plural number of separate spaced point sources lying in a given plane, in which case the hologram upon being read out will reconstruct a separate image of a recorded object corresponding to each and every one of the plural number of point sources.

These and other objects, features and advantages of the present invention will become more apparent from the following detailed description taken together with the accompanying drawings, in which.

Figure 1:
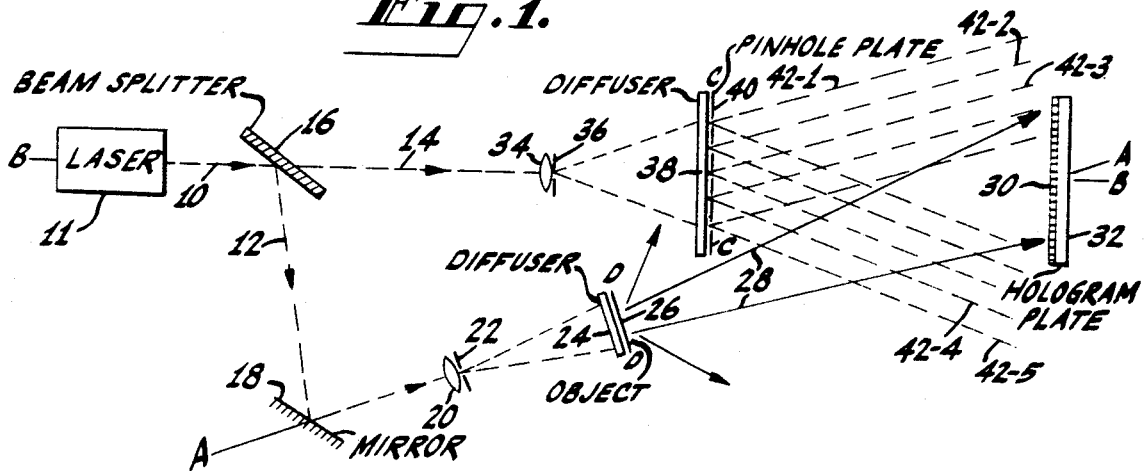
FIG. 1 shows a first preferred embodiment of apparatus for making a hologram of the type with which this invention is concerned.

A coherent light beam 10 is produced by laser 11. Beam 10 is split into first portion beam 12 and second portion beam 14 by beam splitter 16, which may be a partially reflecting mirror. First portion beam 12, in a conventional manner, is passed from a mirror 18 through a beam enlarger including lens 20 and plate 22 having a single pinhole therein, after which it is passed through diffuser 24, and is then spatially modulated by object 26, which may be a transparency or a mask, to form information first component 28 of wave energy. Object 26, as shown, lies in plane D—D. At least a portion of information component 28 impinges upon recording surface 30 of hologram recording medium plate 32.

Second portion beam 14 is passed through a beam enlarger comprising lens 34 and plate 36 having a single pinhole therethrough. The enlarged beam emanating from plate 36 is passed through diffuser 38 and then impinges upon pinhole plate 40 which lies in plane C—C. Plane C—C is substantially parallel to the plane of hologram plate 32. Pinhole plate 40 is provided with five spaced pinholes therein, as shown, each of which acts as a separate point source for each of five spaced divergent reference beams 42–1 ... 42–5, which are derived in response to enlarged second beam portion 14 passing through diffuser 38 and impinging upon pinhole plate 40. The five reference beams 42–1 ... 42–5 form a second component of coherent wave energy which impinges upon recording surface 30 of hologram plate 32 and interferes with that portion of information first component 28 incident on surface 30 to thereby record a particular hologram which depends both on the object information in the first component of wave energy and the number and arrangement of reference beams in the second component of wave energy.

The number and configuration of the pinholes in pinhole plate 40 in FIG. 1 is merely illustrative. In practice, many more pinholes would normally be utilized and the pinholes in pinhole plate 40 would normally be arranged in a two-dimensional configuration, with pinholes arranged within a direction parallel to C—C and also in a direction (into the paper) perpendicular to C—C.

As shown in FIG. 1, the general direction of travel of the information first component is substantially parallel to A—A, while the general direction of travel of the reference beam second component is substantially parallel to B—B. Further the respective reference beams of the second component of coherent energy are substantially symmetrically disposed about B—B, so that one of the reference beams, namely, 42–3, is the most centrally located of all the reference beams. In addition, the wavefront of each of divergent reference beams 42–1 ... 42–5 incident on surface 30 of hologram plate 32 has a given curvature determined by the distance between pinhole plate 40 and hologram plate 32.

Figure 2:
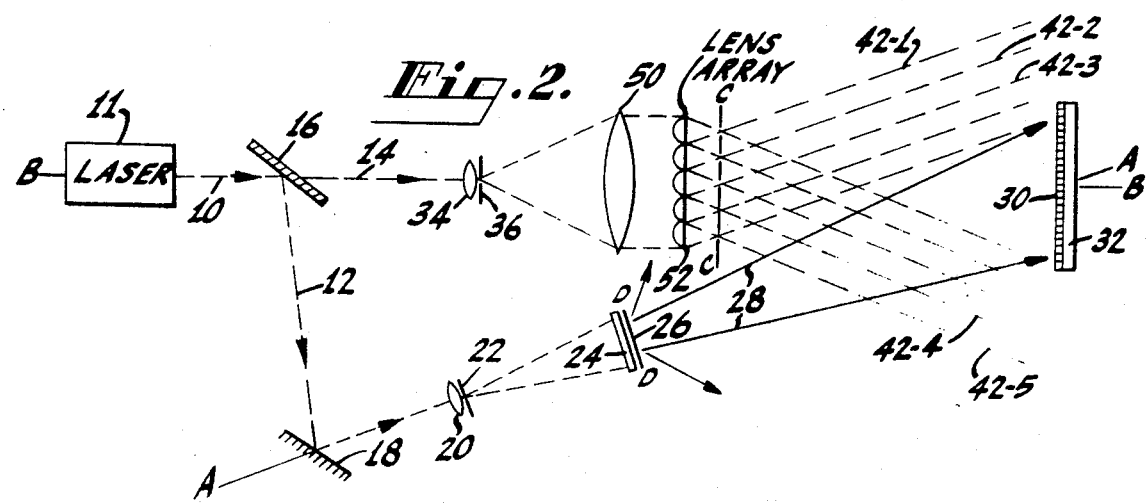
FIG. 2 shows a second preferred embodiment of apparatus for making a hologram of the type with which this invention is concerned.

Referring now to FIG. 2, elements thereof identified by the reference numerals 10, 11, 12, 14, 16, 18, 20, 22, 24, 26, 28, 30, 32, 34, 36 and 42-1 ... 42-5 are identical in structure and function to those elements of FIG. 1 identified by like-numbered reference numerals. The essential difference in structure between the embodiment in FIG. 2 and the embodiment shown in FIG. 1 is the substitution of lens 50 and lens array 52 in FIG. 2 for diffuser 38 and pinhole plate 40 in FIG. 1. Lens 50 converts enlarged beam 14 into a parallel beam which impinges upon lens array 52. Lens 52 is composed, as shown, of a plurality of convex lenses lying in a plane and having their respective foci lying in plane C—C. Thus, as was the case in FIG. 1, divergent reference beams 42-1 ... 42-5 emerge from point sources lying in plane C—C. The substitution of a lens array for a pinhole plate to provide these point sources of wave energy has the benefit of permitting higher intensity reference beams to be achieved for any given intensity of second portion beam 14. In all other respects, the operation of the embodiment shown in FIG. 2 is the same as that of the embodiment shown in FIG. 1.

Figure 3:
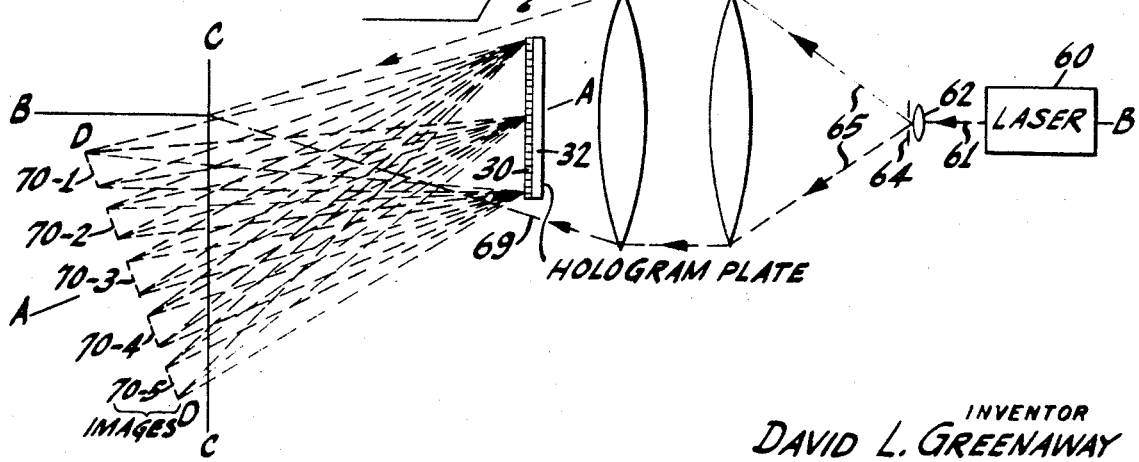
FIG. 3 shows apparatus for reading out a hologram of the type with which this invention is concerned.

FIG. 3 shows apparatus utilized for reconstructing the holographic image recorded on surface 30 of hologram plate 32. This apparatus comprises laser 60 which emits a coherent beam of wave energy 61 having the same wave length as the wave energy emitted by laser 11 of FIGS. 1 and 2. Lasers 11 and 60 are respectively situated on opposite sides of hologram plate 32 and beam 61 travels toward the back side of hologram plate 32 in a direction substantially parallel to axis B—B. Beam 61 is enlarged by beam enlarging means comprising lens 62 and plate 64 having a single pinhole therethrough to form divergent beam 65. Beam 65, in turn, is collimated by lens 66 to form parallel beam 67. Parallel beam 67 is transmitted through lens 68 having a focus lying in plane C—C with respect to hologram plate 32, i.e., plane C—C in FIG. 3 lies in the same relative position with respect to hologram plate 32 as did plane C—C in each of FIGS. 1 and 2. Therefore, convergent reference beam 69 will have a curvature which is the conjugate of the curvature of each of divergent reference beams 42-1 ... 42-5. Further, the location of convergent readout beam 69 with respect to hologram plate 32 is substantially the same as the most centrally located of the group of divergent reference beams utilized in recording the hologram, i.e., reference beam 42-3 in each of FIGS. 1 and 2.

At least a portion of convergent readout beam 69 will travel through the back of hologram plate 32 and be incident on the hologram recorded on surface 30 thereof. The hologram will cause diffraction of the wave energy incident thereon and one of the first order diffraction patterns resulting therefrom will be a group of real images 70-1 ... 70-5, each of which is a replica of object 26 recorded in the hologram. The wave energy which forms images 70-1 ... 70-5 travels in a general direction with respect to hologram plate 32 which is substantially parallel to A—A, i.e., in a direction with respect to hologram plate 32 which is just opposite to the general direction of incident first component 28 of wave energy utilized in making the hologram. Also, images 70-1 ... 70-5 lie substantially in plane D—D with respect to hologram plate 32, i.e., the same plane with respect to hologram plate 32 in which the original object utilized in making the hologram lay. Further, the number and configuration with respect to each other of images 70-1 ... 70-5 corresponds to the number and configuration with respect to each other of the point sources of the reference beam second component of wave energy, such as 42-1 ... 42-5, utilized in recording the hologram.

Since convergent readout beam 69 corresponds substantially exactly to centrally located divergent reference beam 42-3, centrally located image 70-3 will reconstruct object 26 with the highest resolution and the least distortion of all of the reproduced images 70-1 ... 70-5. However, although the fidelity of reproduction of non-centrally located images 70-1, 70-2, 70-4 and 70-5 is somewhat lower than centrally located image 70-3, the resolution and clarity obtainable are more than sufficient for most purposes.

In the embodiment shown in FIGS. 1-3, the wavelength of the wave energy from laser 60 is equal to that from laser 11 and the curvature of converging readout beam 69 is the conjugate of the curvature of each of reference beams 42-1 ... 42-5. This results in the size of each of images 70-1 ... 70-5 being substantially the same as the size of object 26. However, by making the wavelengths and/or the curvatures different, magnification or de-magnification of the size of the images with respect to that of the object may be obtained. Also, although highest fidelity is achieved when the source of readout wave energy is coherent, for many purposes this is not essential.

Generalizing from the foregoing description of the preferred embodiments of the invention shown in FIGS. 1-3, it will be seen that the parameters of the overall image obtained in reading out a hologram made in accordance with the principles of the present invention depend both on any spatial modulation of the incident first component information beam which was present and the operation on the incident second component which was performed by a complex wave modifying structure working on the principles of optics, such as pinhole plate 40 or lens array 52, on wave energy impinging thereon. For instance, rather than utilizing either a pinhole plate or lens array for producing a multiple reference beam, an arrangement of mirrors could be utilized for this purpose. Also, the operation performed by the complex wave modifying structure need not necessarily be that of providing a plurality of spaced reference beams, as shown in FIGS. 1 and 2. The present invention contemplates the use of any other particular complex wave modifying structure working on the principles of optics for producing any other predetermined specific effect on wave energy impinging thereon, to the extent that producing such other specific effect is useful in varying a desired hologram interference pattern to provide a predetermined effect on the image obtained when the hologram is read out. Thus, any particular arrangement and combination of gratings, lenses, mirrors, prisms and/or other wave modifying devices making use of the laws of diffraction, reflection and refraction, such as a microscope, telescope, or lens system which minimize aberrations in the wavefront, which can be used to tailor in a predetermined desired manner the wavefront of one of the incident components used in recording a hologram is intended to be covered by the term "complex wave modifying structure."

What is claimed is

1. A holographic method for obtaining a predetermined array of a given plurality of substantially identical spaced optical real representations of the same given object, comprising the steps of recording on an optical recording medium the holographic interference pattern which results from the simultaneous illumination of said medium by each of a group of mutually coherent components of the same coherent monochromatic light of a given wavelength, said group including a single component of said coherent light that is spatially modulated in accordance with said object and each of a predetermined array of a corresponding plurality of spaced other components of said coherent light equal in number to said given plurality which are arranged in said predetermined array, each respective one of said other components being spatially unmodulated and having a different angular orientation with respect to said single component at said medium, and reading out said recorded holographic interference pattern with a single readout beam which corresponds in angular orientation with respect to said medium to a selected certain single one of said other components.

2. The method defined in claim 1, wherein said selected certain single one of said other components is the most centrally located of all of said other components within said array.

3. The method defined in claim 1, wherein said single readout beam is coherent monochromatic light of said given wavelength, and wherein the angular orientation of said readout beam with respect to said medium is the conjugate of said selected certain single one of said other components.

* * * * *